March 29, 1955

D. D. DAIL 2,705,157

TRAILER HITCH

Filed Nov. 20, 1951

INVENTOR
DONALD D. DAIL,

BY
McMorrow, Berman + Davidson
ATTORNEYS

United States Patent Office 2,705,157
Patented Mar. 29, 1955

2,705,157

TRAILER HITCH

Donald D. Dail, Erie, Ill.

Application November 20, 1951, Serial No. 257,340

4 Claims. (Cl. 280—515)

This invention relates to trailer hitches, and more particularly to a quick detachable hitch for connecting a trailing vehicle, such as a wagon, to a towing vehicle, such as an agricultural tractor.

It is among the objects of the invention to provide an improved trailer hitch for connecting a trailing vehicle, such as a wagon, to a towing vehicle, such as an agricultural tractor, which provides for the quick and easy attachment of the trailing vehicle to or detachment of the trailing vehicle from the tractor vehicle; which includes a coupling pin and means permanently connecting the coupling pin to the hitch and holding the pin in operative position so that the pin cannot be lost and no extra fastener, such a cotter key, bolt, nut or screw is required to maintain the coupling pin in place; and which is simple and durable in construction, economical to manufacture and positive and effective in use.

Other objects and advantages will become apparent from a consideration of the following description and the appended claims in conjunction with the accompanying drawing, wherein:

Figure 1:
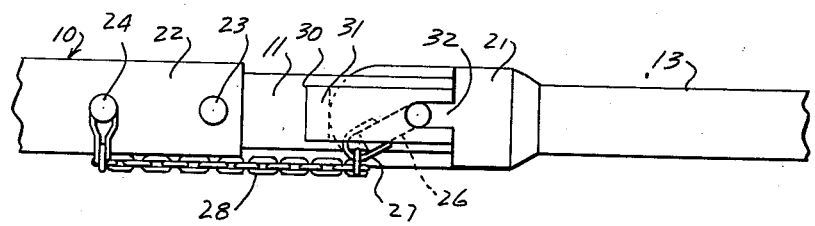
Figure 1 is a top plan view of a trailer hitch illustrative of the invention.

With continued reference to the drawing, the numeral 10 generally indicates a tractor tow bar comprising end portions 11 and 12, parts of which are substantially parallel and normally vertically separated to receive the front end of a trailer tongue 13 therebetween.

The end portion 12 is in the form of a straight, flat bar of rectangular shape having apertures 14 and 15 spaced apart longitudinally thereof near one end and an aperture 16 located near the other end thereof. The end portion 11 also comprises a flat bar of rectangular shape having apertures 17 and 18 spaced apart longitudinally thereof near one end and an aperture 19 adjacent the other end thereof. Intermediate its length the bar 11 is provided with an angular offset 20 so that the end portions containing the apertures 17 and 18 and the aperture 19, respectively, are disposed substantially in spaced apart and parallel planes. The portion of the bar 11 containing the apertures 17 and 18 is superimposed on the portion of the bar 12 containing the apertures 14 and 15 with the aperture 17 in registry with the aperture 14 and the aperture 18 in registry with the aperture 15, the portion of the bar 11 containing the aperture 19 being spaced from and substantially parallel to the portion of the bar 12 containing the aperture 16, the spaced apart portions of the bars 11 and 12 being normally vertically separated a distance to freely receive the flat front end portion 21 of the trailer tongue 13 therebetween, the flat end portion 21 of the trailer tongue being provided with an aperture registering with the apertures 16 and 19 in the bars 11 and 12.

The superimposed portions of the bars 11 and 12 are received in the open end of a tow bar 22 of channel or rectangular, tubular shape, which extends rearwardly from the tractor, not illustrated. The tow bar 22 is provided near its rear end with apertures spaced longitudinally thereof and bolts 23 and 24 extend through the apertures in the tow bar 22 and through the registering apertures in the superimposed portions of the bars 11 and 12, and firmly secure the superimposed end portions of the bars 11 and 12 in the rear end of the tow bar 22, so that the separated portions of the bars 11 and 12 constitute, in effect, a clevis at the rear end of the tow bar.

A coupling pin 25 extends through the apertures 19 and 16 in the bars 11 and 12 and in the registering aperture in the flattened end portion 21 of the tongue 13, and this coupling pin is provided at its upper end with a perpendicularly offset portion 26 which rests on the upper surface of the bar 11 to hold the coupling pin against movement downwardly through the registering apertures in the bars 11 and 12 and the trailer tongue 13.

A wire loop 27 is secured to the offset end portion 26 of the pin 25 at the distal end of the offset portion, and a chain 28 is secured at one end to the loop 27 and at its other end to the tow bar 22 by the bolt 24, which is the one of the two bolts 23 and 24 most remote from the rear end of the tow bar 22. This chain 28 permanently connects the coupling pin 25 to the tow bar of the tractor and obviates loss of the pin.

Figure 2:
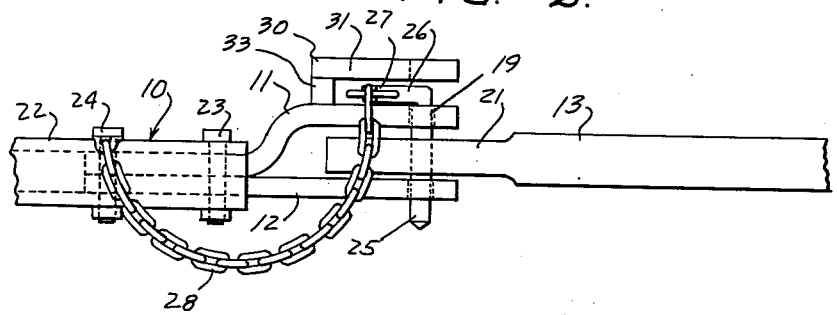
Figure 2 is a side elevational view of the trailer hitch illustrated in Figure 1.
Figure 3:
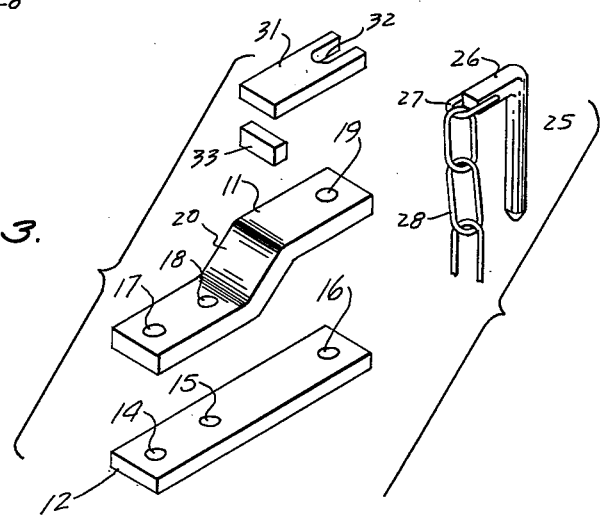
Figure 3 is a perspective exploded view of the components of the trailer hitch.

A guard 30 is mounted on the upper side of the portion of the bar 11 containing the aperture 19, and comprises a flat, rectangular plate or body 31 having a notch 32 in one end thereof and a block 33 of rectangular shape. The block 33 is secured to the upper surface of the bar 11 at a location spaced from the side of the aperture 19 remote from the rear end of this bar, and the plate 31 is secured at its end remote from the notch 32 to the upper surface of the block 33 and extends rearwardly from the block 33 over the upper end of the coupling pin 25 when the coupling pin is in operative position, as illustrated in Figures 1 and 2. The notch 33 is positioned directly over the aperture 19 in the bar 11 and provides freedom for withdrawing the coupling pin 25 from the bars 11 and 12 and the trailer tongue 13 when the offset end portion 26 of the coupling pin is rearwardly directed. The chain 28, however, normally sags by its own weight between the bolt 24 and the offset upper end portion of the coupling pin, and holds the offset upper end of the coupling pin away from a rearwardly directed position so that the pin cannot accidentally jump out of the apertures in the bars 11 and 12, and the tongue 13. In order to manually withdraw the coupling pin, however, it is necessary only to grasp the loop 27, turn the pin to a position at which the offset upper end portion 26 thereof is rearwardly directed and then lift the pin upwardly through the notch 32 in the guard 30, thereby freeing the tongue 13 of the trailing vehicle from the tow bar 22 of the tractor vehicle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A trailer hitch comprising a tow bar having substantially parallel end portions provided with mutually registering apertures and normally vertically separated to receive one end of a trailer tongue therebetween, a tongue having one end disposed between the end portions of said tow bar and having an aperture therein registering with the apertures in said end portions, a coupling pin extending through said apertures and having at one end a perpendicularly offset portion adapted to rest on the upper surface of the upper end portion of said tow bar, a loop secured to the offset end portion of said pin at the distal end of said offset portion, a chain secured at one end to said loop and at its other end to said tow bar at a location spaced from said pin, and a guard for said pin comprising a flat body of rectangular shape secured at one end to the upper end portion of said tow bar at the side of the aperture in the latter remote from the rear end of the tow bar and extending rearwardly over the offset end portion of said pin, said guard having in its rear end a notch through which the coupling pin can be withdrawn from the tow bar and tongue when the offset end portion of the pin is rearwardly directed and the weight of said chain normally holding the offset end portion of said coupling pin away from said rearwardly directed position.

2. A trailer hitch comprising a hollow tow bar having an aperture adjacent the rear end thereof, a first bar of flat rectangular shape having apertures disposed one adjacent each end thereof, a second bar of flat rectangular shape having substantially parallel end portions offset from each other and apertures disposed one near each end thereof, said bars being coterminously disposed with one end portion of said second bar superimposed on said straight bar and received with the corresponding portion of said straight bar in the rear end of said hollow tow bar, a bolt extending through said tow bar and said first and second bars, a coupling pin receivable in the apertures in said first and second bars at the ends of the latter remote from said bolt and having at one end a perpendicularly offset portion, a chain connected at one end to said bolt and at its other end to the offset portion of said coupling pin at the distal end of said offset portion, the portions of said first and second bars projecting from the rear end of said tow bar constituting a tongue-receiving clevis, and a guard mounted on the normally upper side of said clevis and extending over the offset end portion of said coupling pin when said pin is received in said clevis apertures, said guard having a rearwardly opening notch therein registering with the adjacent apertures in said clevis and through which said coupling pin can be withdrawn from said clevis when the offset end portion of said coupling pin is rearwardly directed, the weight of said chain normally holding the offset portion of said coupling pin away from a rearwardly directed position.

3. In combination with a trailer hitch including a clevis having spaced apart upper and lower legs each provided with an aperture so disposed that the aperture in one leg registers with the aperture in the other leg of the clevis, and a coupling pin extending through said apertures to pivotally connect a tongue to said clevis, means releasably retaining said coupling pin in place in the apertures in said clevis comprising a perpendicularly offset portion on the upper end of said pin resting on the outer side of the upper leg of said clevis, a guard plate mounted at one end on said upper clevis leg and extending longitudinally from said one end over the upper end of said coupling pin in spaced relationship to said upper clevis leg and having a notch extending longitudinally from the other end thereof through which said coupling pin can be withdrawn upwardly from said clevis apertures when the offset portion of said pin is disposed longitudinally of said guard plate and directed away from said one end of the guard plate, and a flexible member connected at one end to the distal end of the offset portion of said coupling pin with its other end fixed relative to said clevis at a location spaced from said guard plate in a direction from said other end to said one end of the guard plate and having sufficient weight to maintain this offset portion of said coupling pin out of registry with the notch in said guard plate by the action of gravity on said flexible member.

4. In combination with a trailer hitch including a clevis having spaced apart legs each provided with an aperture so disposed that the aperture in one leg registers with the aperture in the other leg of the clevis, and a coupling pin extending through said apertures to pivotally connect a tongue to said clevis, means releasably retaining said coupling pin in place in the apertures in said clevis comprising a perpendicularly offset portion on one end of said pin bearing against the outer side of the adjacent leg of said clevis, a guard plate mounted at one end on the leg of said clevis adjacent the offset portion of said pin and extending longitudinally from said one end over the adjacent end of said pin and the offset portion of the coupling pin in spaced relationship to said adjacent clevis leg and having a notch extending longitudinally from the other end thereof through which said coupling pin can be withdrawn from said clevis apertures when the offset portion of said pin is disposed longitudinally of said guard plate and directed away from said one end of the guard plate, and a flexible member connected at one end to the distal end of the offset portion of said coupling pin with its other end fixed relative to said clevis at a location spaced from said guard plate in a direction from said other end to said one end of the guard plate and having sufficient weight to maintain the offset portion of said coupling pin out of registry with the notch in said guard plate by the action of gravity on said flexible member.

References Cited in the file of this patent

UNITED STATES PATENTS

| Re. 13,470 | Nelson | Oct. 1, 1942 |
| 2,002,922 | Onken | May 28, 1935 |
| 2,482,907 | Hagen | Sept. 27, 1949 |

FOREIGN PATENTS

| 106,052 | Sweden | Dec. 1, 1942 |